US012062331B2

(12) United States Patent
Weng et al.

(10) Patent No.: US 12,062,331 B2
(45) Date of Patent: Aug. 13, 2024

(54) OLED PIXEL COMPENSATION CIRCUIT, DRIVING METHOD AND DISPLAY DEVICE

(71) Applicants: Fuzhou BOE Optoelectronics Technology Co., Ltd., Fujian (CN); BOE TECHNOLOGY GROUP CO., LTD., Beijing (CN)

(72) Inventors: Zuwei Weng, Beijing (CN); Weize Xu, Beijing (CN); Bin Weng, Beijing (CN)

(73) Assignees: Fuzhou BOE Optoelectronics Technology Co., Ltd., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 611 days.

(21) Appl. No.: 17/040,582

(22) PCT Filed: Jul. 23, 2019

(86) PCT No.: PCT/CN2019/097284

§ 371 (c)(1),
(2) Date: Sep. 23, 2020

(87) PCT Pub. No.: WO2021/012182

PCT Pub. Date: Jan. 28, 2021

(65) Prior Publication Data

US 2023/0103680 A1 Apr. 6, 2023

(51) Int. Cl.
*G09G 3/3233* (2016.01)
*G09G 3/3266* (2016.01)
*G09G 3/3275* (2016.01)

(52) U.S. Cl.
CPC ......... *G09G 3/3233* (2013.01); *G09G 3/3266* (2013.01); *G09G 3/3275* (2013.01)

(58) Field of Classification Search
None
See application file for complete search history.

(56) References Cited

U.S. PATENT DOCUMENTS

2012/0120042 A1* 5/2012 Tsai ..................... G09G 3/3233 345/76
2015/0130779 A1* 5/2015 Chang .................. G09G 3/3233 345/212

(Continued)

FOREIGN PATENT DOCUMENTS

CN 102254510 A 11/2011
CN 203311818 U 11/2013

(Continued)

OTHER PUBLICATIONS

China Patent Office, First Office Action (OA1) issued on Nov. 26, 2020 and the English translation for CN201980001117.2.

*Primary Examiner* — Kirk W Hermann
(74) *Attorney, Agent, or Firm* — HOUTTEMAN LAW LLC

(57) ABSTRACT

An OLED pixel compensation circuit, a driving method thereof, and a display device are provided. The OLED pixel compensation circuit includes an input sub-circuit, a compensation sub-circuit, a driving sub-circuit and a light-emitting sub-circuit. The input sub-circuit is coupled to the compensation sub-circuit and configured to input a data signal into the compensation sub-circuit. The compensation sub-circuit is coupled to the driving sub-circuit and the light-emitting sub-circuit and configured to compensate a threshold voltage of the driving sub-circuit. The driving sub-circuit is configured to drive the light-emitting sub-circuit to emit light after the threshold voltage of the driving sub-circuit is compensated.

19 Claims, 2 Drawing Sheets

(56) References Cited

U.S. PATENT DOCUMENTS

| | | | | |
|---|---|---|---|---|
| 2015/0154906 | A1* | 6/2015 | Chung | G09G 3/3233 345/212 |
| 2015/0379934 | A1* | 12/2015 | Xiaoling | G09G 3/3258 345/76 |
| 2016/0012799 | A1 | 1/2016 | Kim | |
| 2017/0249900 | A1* | 8/2017 | Xiang | G09G 3/3291 |
| 2018/0233086 | A1* | 8/2018 | He | G09G 3/3233 |
| 2019/0005874 | A1* | 1/2019 | Zhang | G09G 3/3233 |
| 2020/0152130 | A1* | 5/2020 | Hong | H10K 59/123 |
| 2021/0005138 | A1* | 1/2021 | Umezawa | G09G 3/3233 |

FOREIGN PATENT DOCUMENTS

| | | | | | |
|---|---|---|---|---|---|
| CN | 104332138 | A | | 2/2015 | |
| CN | 205451748 | U | * | 8/2016 | |
| CN | 205451748 | U | | 8/2016 | |
| CN | 106205491 | A | | 12/2016 | |
| CN | 107393477 | A | | 11/2017 | |
| CN | 108665851 | A | * | 10/2018 | G09G 3/3208 |
| WO | WO-2017117983 | A1 | * | 7/2017 | G09G 3/3233 |

* cited by examiner

OLED PIXEL COMPENSATION CIRCUIT, DRIVING METHOD AND DISPLAY DEVICE

CROSS REFERENCE TO RELATED APPLICATIONS

This is a National Phase Application filed under 35 U.S.C. 371 as a national stage of PCT/CN2019/097284, filed on Jul. 23, 2019, the contents of which are incorporated herein by reference in their entirety.

TECHNICAL FIELD

The present disclosure relates to the field of display technologies, and in particular, to an OLED pixel circuit, a driving method, and a display device.

BACKGROUND

Organic light-emitting diodes (OLEDs) have been widely used as light-emitting elements of display devices, which are referred to as OLED display devices, due to the OLEDs' advantages of self-luminescence, small size, light weight, low power consumption, and the like. Depending on an addressing scheme for pixels of each of the OLED display devices, the OLED display devices may be classified as an active matrix OLED (AMOLED) display device and a passive matrix OLED (PMOLED) display device. The AMOLED display device has the characteristics of fast response speed, high contrast, wide viewing angle, and the like, and thus is widely adopted.

SUMMARY

Embodiments of the present disclosure provide an OLED pixel compensation circuit, a driving method thereof, and a display device.

An aspect of the present disclosure provides an OLED pixel compensation circuit, which includes an input sub-circuit, a compensation sub-circuit, a driving sub-circuit, a light-emitting sub-circuit, a data line, a scan line, and a light-emitting control line, wherein the input sub-circuit is coupled to the compensation sub-circuit and configured to input a data signal into the compensation sub-circuit;

the compensation sub-circuit is coupled to the driving sub-circuit and the light-emitting sub-circuit and configured to compensate a threshold voltage of the driving sub-circuit;

the driving sub-circuit is configured to drive the light-emitting sub-circuit to emit light after the threshold voltage of the driving sub-circuit is compensated;

the data line is configured to provide the data signal to the input sub-circuit;

the scan line is configured to provide a scan signal to the input sub-circuit; and the light-emitting control line is configured to provide a light-emitting control signal to the compensation sub-circuit.

In an embodiment, the OLED pixel compensation circuit further includes a reference voltage line, wherein the reference voltage line is configured to provide a reference voltage to the input sub-circuit, and the reference voltage is lower than a voltage of the data signal.

In an embodiment, the input sub-circuit includes a first transistor and a second transistor;

the first transistor has a first electrode coupled to the reference voltage line, a second electrode coupled to the compensation sub-circuit, and a gate electrode coupled to the scan line; and the second transistor has a first electrode coupled to the data line, a second electrode coupled to the compensation sub-circuit, and a gate electrode coupled to the scan line.

In an embodiment, the compensation sub-circuit includes a third transistor, a fourth transistor and a storage capacitor;

the third transistor has a first electrode coupled to the second electrode of the first transistor, a second electrode coupled to the second electrode of the second transistor, and a gate electrode coupled to the light-emitting control line;

the fourth transistor has a first electrode coupled to the driving sub-circuit, a second electrode coupled to the light-emitting sub-circuit, and a gate electrode coupled to the light-emitting control line; and the storage capacitor has a first terminal coupled to the second electrode of the second transistor and the second electrode of the third transistor, and a second terminal coupled to the first electrode of the fourth transistor.

In an embodiment, the driving sub-circuit includes a driving transistor, which has a first electrode coupled to a positive power supply, a second electrode coupled to the first electrode of the fourth transistor, and a gate electrode coupled to the second electrode of the first transistor and the first electrode of the third transistor.

In an embodiment, the driving transistor is an N-type transistor, and the first electrode of the driving transistor is a drain electrode of the N-type transistor.

In an embodiment, the light-emitting sub-circuit includes an organic light-emitting diode, and an anode of the organic light-emitting diode is coupled to the second electrode of the fourth transistor.

Another aspect of the present disclosure provides a display device, which includes the OLED pixel compensation circuit according to any one of the foregoing embodiments of the present disclosure.

Still another aspect of the present disclosure provides a driving method of an OLED pixel compensation circuit, wherein the OLED pixel compensation circuit is the OLED pixel compensation circuit according to any one of the foregoing embodiments of the present disclosure, each of the first, second, third and fourth transistors is an N-type transistor, and the driving method includes:

in a data input stage, inputting a high level through the scan line and inputting a low level through the light-emitting control line; and in a compensation and light-emitting stage, inputting a low level through the scan line and inputting a high level through the light-emitting control line.

DETAILED DESCRIPTION

To make one of ordinary skill in the art to better understand technical solutions of the present disclosure, an OLED pixel compensation circuit, a driving method thereof, and a display device of the present disclosure will be described in further detail below with reference to the accompanying drawings and exemplary embodiments.

Figure 1:
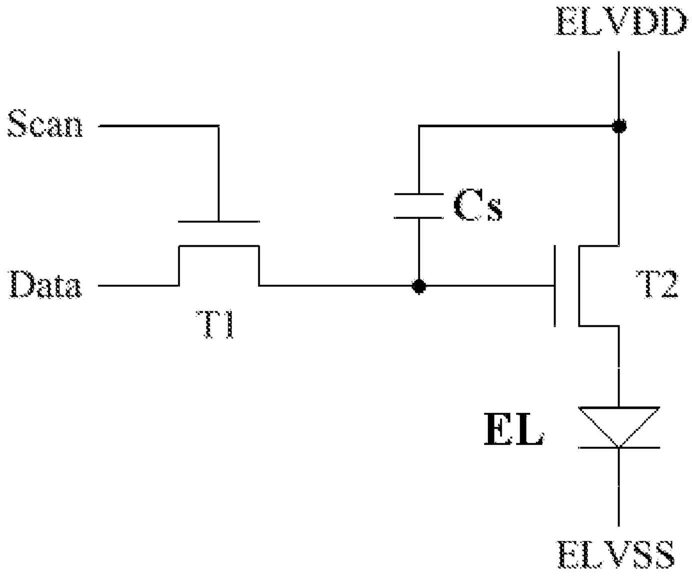
FIG. 1 is a schematic diagram showing a structure of an OLED pixel circuit according to an embodiment of the present disclosure.

An OLED display device may include a plurality of pixels and a plurality of OLED pixel circuits in one-to-one correspondence with the plurality of pixels. As shown in FIG. 1, an embodiment of the present disclosure provides an OLED pixel circuit corresponding to one pixel, and the OLED pixel circuit may be applied to an AMOLED display device. The OLED pixel circuit employs a structure of 2T1C (i.e., 2 transistors and 1 capacitor). Specifically, the OLED pixel circuit may include a switching transistor T1, a driving transistor T2, and a storage capacitor Cs. In an embodiment, the OLED pixel circuit may further include an organic light-emitting diode EL, a scan line Scan, a data line Data, a positive (or anode) power line ELVDD, and a negative (or cathode) power line ELVSS. The switching transistor T1 has a first electrode coupled to the data line Data, a second electrode coupled to a first terminal of the storage capacitor Cs, and a gate electrode coupled to the scan line Scan. The driving transistor T2 has a first electrode coupled to a second terminal of the storage capacitor Cs and a positive power supply, a second electrode coupled to an anode of the organic light-emitting diode EL, and a gate electrode coupled to the second electrode of the switching transistor T1 and the first terminal of the storage capacitor Cs. A cathode of the organic light-emitting diode EL is coupled to a negative power supply.

The operating principle of the OLED pixel circuit shown in FIG. 1 is as follows. When the scan line Scan supplies a turn-on level, the switching transistor T1 is turned on, and a data signal Vdata supplied from the data line Data is stored in the storage capacitor Cs. A voltage signal stored by the storage capacitor Cs (i.e., a voltage at the first terminal of the storage capacitor Cs) may turn on the driving transistor T2, such that a signal supplied from the positive power supply ELVDD is transmitted to the light-emitting diode EL through the driving transistor T2, thereby converting the input data signal Vdata into a current signal required for light-emitting of the organic light-emitting diode EL. The organic light-emitting diode EL displays different gray scales according to the current signal.

In general, low temperature polysilicon (LTPS) is adopted to form the transistors in the OLED pixel circuits. The inventors of the present inventive concept have found that, since the current LTPS process employs a laser annealing technique, there is a large difference in threshold voltages Vth of transistors formed under a same condition. In a low gray scale picture, non-uniformity of the LTPS AMOLED pixel circuit of the 2T1C structure in a small range in a same direction may reach 30% to 40%, even a difference between adjacent transistors may reach 20%. In addition, the positive power line ELVDD supplies a voltage VDD to OLED pixel circuits in a same column, and in a case where the positive power line ELVDD is long (i.e., in a case of a large-sized display panel or display device), a large IR drop may occur on the positive power line ELVDD, such that a voltage received by a subsequent OLED pixel circuit is lower than a voltage received by a previous OLED pixel circuit, resulting in non-uniform display grays of the OLED display device. Therefore, a display device including the OLED pixel circuit has poor display effects. For example, in a low gray scale image, the non-uniformity in brightness caused by the IR drop of 1.0V in a same OLED pixel circuit with the 2T1C structure may reach 70% or more. Therefore, it is desirable to compensate, for example, the difference in a threshold voltage Vth of the driving transistors and the IR drop on the positive power line ELVDD to mitigate or eliminate the problem of the non-uniform display gray scales of the OLED display device due to the difference in the threshold voltage Vth of the driving transistors and the IR drop on the positive power line ELVDD.

Figure 2:
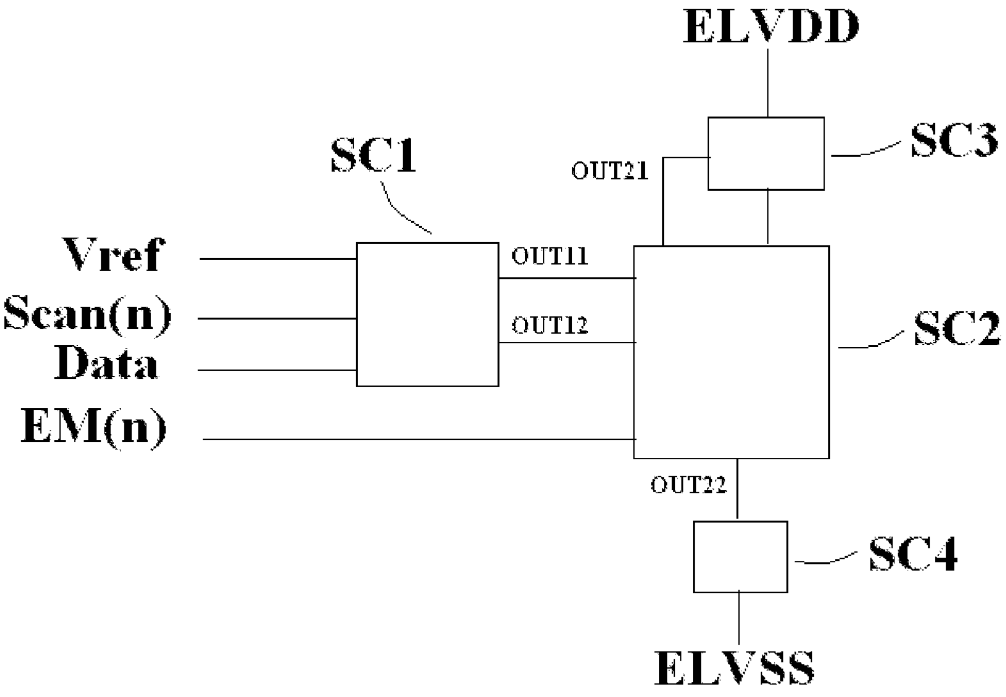
FIG. 2 is a block diagram showing a structure of an OLED pixel compensation circuit according to an embodiment of the present disclosure.

Embodiments of the present disclosure provide an OLED pixel compensation circuit, as shown in FIG. 2. The OLED pixel compensation circuit may include an input sub-circuit SC1, a compensation sub-circuit SC2, a driving sub-circuit SC3, and a light-emitting sub-circuit SC4. The input sub-circuit SC1 is coupled to the compensation sub-circuit SC2, and is configured to input the data signal Vdata to the compensation sub-circuit SC2. The compensation sub-circuit SC2 is coupled to the driving sub-circuit SC3 and the light-emitting sub-circuit SC4 (e.g. via a first output terminal OUT21 and a second output terminal OUT22 of the compensation sub-circuit SC2, respectively), and is configured to compensate the threshold voltage Vth of the driving sub-circuit SC3. The driving sub-circuit SC3 is configured to drive the light-emitting sub-circuit SC4 to emit light after the threshold voltage Vth of the driving sub-circuit SC3 is compensated.

The OLED pixel compensation circuit can not only compensate the non-uniformity of the threshold voltages Vth of the driving sub-circuits, but also eliminate the influence of the IR drop of a power supply on the display uniformity of the display device including the OLED pixel compensation circuit, thereby improving the display effect of the display device.

In an embodiment, the OLED pixel compensation circuit may further include a data line Data and a scan line Scan (an example of which is a scan line Scan(n) of the N-th OLED pixel compensation circuit as shown in FIG. 2). The data line Data is configured to provide the data signal Vdata to the input sub-circuit SC1, and the scan line Scan is configured to provide a scan signal Vscan to the input sub-circuit SC1. The data signal Vdata corresponds to information to be displayed. The scan signal Vscan may control the input sub-circuit SC1 to be turned on or off.

In an embodiment, the OLED pixel compensation circuit may further include a reference voltage line (i.e., the line shown in FIGS. 2 and 3 coupled to a reference voltage Vref) configured to provide the reference voltage Vref to the input sub-circuit SC1. In an embodiment, the reference voltage Vref is less than a voltage of the data signal, i.e., Vref<Vdata. In a case where the scan signal Vscan is at the turn-on level, the reference voltage Vref may be output to the compensation sub-circuit SC2 through a first output terminal OUT11 of the input sub-circuit SC1, and the data signal Vdata may be output to the compensation sub-circuit SC2 through a second output terminal OUT12 of the input sub-circuit SC1.

In an embodiment, the OLED pixel compensation circuit may further include a light-emitting control line EM (an example of which is a light-emitting control line EM(n) of the N-th OLED pixel compensation circuit is shown in FIG. 2) configured to provide a light-emitting control signal Vem to the compensation sub-circuit SC2. The light-emitting control signal Vem may control the compensation sub-circuit SC2 to be turned on or off.

The OLED pixel compensation circuit is an OLED pixel circuit capable of compensating the difference in threshold voltage Vth of the driving sub-circuits SC3 (i.e., eliminating the defect of non-uniform gray scales of display caused by the difference in threshold voltage Vth of the driving sub-circuits SC3).

Figure 3:
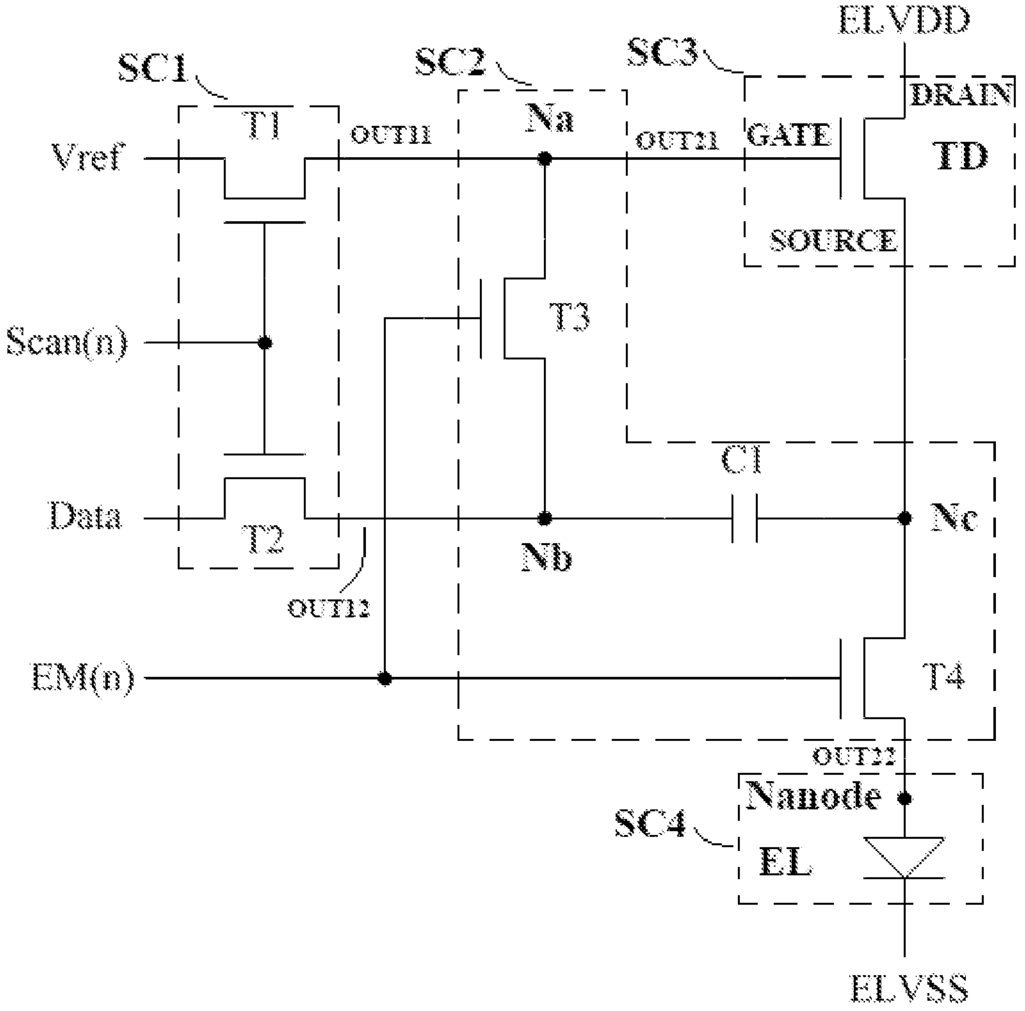
FIG. 3 is a schematic diagram showing a structure of the OLED pixel compensation circuit shown in FIG. 2.

As an example, FIG. 3 shows an implementation of the OLED pixel compensation circuit shown in FIG. 2. The OLED pixel compensation circuit shown in FIG. 3 has a structure of 5T1C (i.e., 5 transistors and 1 capacitor).

In an embodiment, the input sub-circuit SC1 may include a first transistor T1 and a second transistor T2. The first transistor T1 has a first electrode coupled to the reference voltage line, a second electrode coupled to the compensation sub-circuit SC2, and a gate electrode coupled to the scan line Scan. The second transistor T2 has a first electrode coupled to the data line Data, a second electrode coupled to the compensation sub-circuit SC2, and a gate electrode coupled to the scan line Scan.

In an embodiment, the compensation sub-circuit SC2 may include a third transistor T3, a fourth transistor T4, and a storage capacitor C1. The third transistor T3 has a first electrode coupled to the second electrode of the first transistor T1 (i.e., coupled to a node Na), a second electrode coupled to the second electrode of the second transistor T2 (i.e., coupled to a node Nb), and a gate electrode coupled to the light-emitting control line EM. The fourth transistor T4 has a first electrode coupled to the driving sub-circuit SC3, a second electrode coupled to the light-emitting sub-circuit SC4 (i.e., to a node Nanode), and a gate electrode coupled to the light-emitting control line EM. The storage capacitor C1 has a first terminal coupled to the second electrode of the second transistor T2 and the second electrode of the third transistor T3 (i.e., coupled to the node Nb), and a second terminal coupled to the first electrode of the fourth transistor T4 (i.e., coupled to a node Nc).

In an embodiment, the driving sub-circuit SC3 may include a driving transistor TD. The driving transistor TD has a first electrode coupled to the positive power supply ELVDD, a second electrode coupled to the first electrode of the fourth transistor T4 (i.e., coupled to the node Nc), and a gate electrode coupled to the second electrode of the first transistor T1 and the first electrode of the third transistor T3 (i.e., coupled to the node Na).

In an embodiment, the driving transistor is an N-type transistor. The first electrode of the driving transistor is a drain electrode DRAIN of the N-type transistor, and the second electrode of the driving transistor is a source electrode SOURCE of the N-type transistor. A gate electrode GATE of the driving transistor TD is coupled to the second electrode of the first transistor T1 and the first electrode of the third transistor T3 (i.e., coupled to the node Na).

In an embodiment, the light-emitting sub-circuit SC4 may include an organic light-emitting diode EL. The organic light-emitting diode EL has an anode coupled to the second electrode of the fourth transistor T4, and a cathode coupled to the negative power supply ELVSS.

In an embodiment, the positive power supply ELVDD may provide a positive voltage, and the negative power supply ELVSS may provide a negative voltage. The voltage Vdata of the data signal may be a positive voltage, the reference voltage Vref may be a positive voltage, and Vref<Vdata.

It should be understood that in the present disclosure, the turn-on level refers to a level at which the associated transistor is turned on. For example, in the case of an N-type transistor, the turn-on level is a high level, and in the case of a P-type transistor, the turn-on level is a low level. In addition, a voltage of the positive power supply ELVDD may be higher than a voltage of the negative power supply ELVSS, such that the light-emitting sub-circuit SC4 (e.g., the organic light-emitting diode EL) may operate normally. The first transistor T1, the second transistor T2, the third transistor T3, and the fourth transistor T4 may all be N-type transistors, may all be P-type transistors, or may be a combination of N-type transistors and P-type transistors.

Next, the operation principle of the OLED pixel compensation circuit shown in FIGS. 2 and 3 will be described by taking an example in which the first transistor T1, the second transistor T2, the third transistor T3, and the fourth transistor T4 are all N-type transistors.

Figure 4:
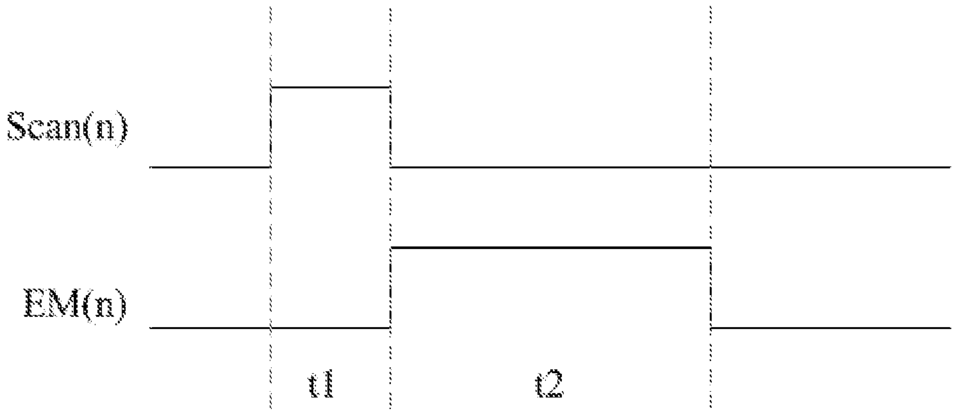
FIG. 4 is a signal timing diagram of the OLED pixel compensation circuit shown in FIG. 3.

Referring to FIGS. 3 and 4, the operation of the OLED pixel compensation circuit may include two stages: a data input stage t1 and a compensation and light-emitting stage t2.

For example, in the data input stage T1, the scan line Scan(n) is at a high level, and the light-emitting control line EM(n) is at a low level, such that the first transistor T1 and the second transistor T2 are turned on, and the third transistor T3 and the fourth transistor T4 are turned off. At this time, a potential of the node Na is Vref, and a potential of the node Nb is Vdata. Since the voltage Vgs between the gate electrode and the source electrode of the driving transistor TD is Vgs=Vref−Vanode (where the voltage Vanode is a voltage of the anode of the organic light-emitting diode EL in a light-emitting period of a previous frame), the voltage Vref is set such that Vgs=Vref−Vanode>Vth, the driving transistor TD is turned on. In this case, a potential of the node Nc is charged continuously to Vref-Vth such that the driving transistor TD is turned off. At this time, the data input stage ends.

For example, in the compensation and light-emitting stage t2, the scan line Scan(n) is at a low level, and the light-emitting control line EM(n) is at a high level, such that the first transistor T1 and the second transistor T2 are turned off, while the third transistor T3 and the fourth transistor T4 are turned on. Since a voltage difference across the storage capacitor C1 cannot undergo a sudden change, at this time, the potential of the node Nc becomes the voltage Vanode of the anode of the organic light-emitting diode EL, and the potential of the node Nb is Vdata−Vref+Vth+Vanode. Since the third transistor T3 is turned on, the potential of the node Na is equal to the potential Vdata−Vref+Vth+Vanode of the node Nb. In this case, since the voltage Vgs between the gate electrode and the source electrode of the driving transistor TD is Vgs=Vdata−Vref+Vth+Vanode−Vanode=Vdata−Vref+Vth>Vth, the driving transistor TD is turned on, and the voltage supplied from the positive power supply ELVDD is transmitted to the organic light-emitting diode EL through the driving transistor TD, thereby driving the organic light-emitting diode EL to emit light.

The data input stage t1 and the compensation and light-emitting stage t2 described above may occur repeatedly.

A current flowing through the driving transistor TD (i.e., the current flowing through the organic light-emitting diode EL) is determined by the following formula (1).

$$Ioled = \frac{1}{2}Cox\frac{uW}{L}(Vgs - Vth)^2 \quad (1)$$

As described above, since Vgs=Vdata−Vref+Vth, the following formula (2) may be derived:

$$Ioled == \frac{1}{2}Cox\frac{uW}{L}[(Vdata - Vref + Vth) - Vth)]^2 = \frac{1}{2}Cox\frac{uw}{L}(Vdata - Vref)^2 \quad (2)$$

where Cox is a capacitance of a channel of the driving transistor TD per unit area, u is a mobility of the channel of the driving transistor TD, W is a width of the channel of the driving transistor TD, and L is a length of the channel of the driving transistor TD.

As can be seen from the above formula (2), since the reference voltage Vref is merely a reference power plane and does not generate a current through the organic light-emitting diode EL, a problem regarding the IR drop is not resulted from the reference voltage Vref. In addition, the threshold voltage Vth of the driving transistor TD is absent from the above formula (2), and thus a drift (or variation) of the threshold voltage Vth of the driving transistor TD has no influence on the current Ioled flowing through the organic light-emitting diode EL, thereby solving the problem of non-uniformity in the display gray scales of the OLED display device caused by a difference in threshold voltage Vth of the driving transistor and an IR drop on the positive power line ELVDD.

As described above, the OLED pixel compensation circuit may not only compensate the non-uniform display gray scales influenced by the non-uniformity of the threshold voltage Vth of the driving transistor, but also eliminate the influence of the IR drop of the power supply on the display gray scales, thereby improving the display effect of the OLED display device. In addition, the OLED pixel compensation circuit has a simple structure and simple driving timing.

Embodiments of the present disclosure provide a display device (e.g., an OLED display device), which includes the OLED pixel compensation circuit according to the embodiment shown in FIG. 2 or 3. In an embodiment, the display device may further include other components known in the art, such as a row driver and a column driver for automatically driving rows and columns, respectively, of a plurality of pixels arranged in a matrix (or array).

Embodiments of the present disclosure provide a driving method of an OLED pixel compensation circuit, as shown in FIGS. 3 and 4. This OLED pixel compensation circuit may be the OLED pixel compensation circuit according to the embodiment of FIG. 3, and each of the first transistor T1, the second transistor T2, the third transistor T3 and the fourth transistor T4 may be an N-type transistor. The driving method may include a data input stage t1 and a compensation and light-emitting stage t2.

In the data input stage t1, a high level is input through the scan line Scan(n), and a low level is input through the light-emitting control line EM(n).

In the compensation and light-emitting stage t2, a low level is input through the scan line Scan(n), and a high level is input through the light-emitting control line EM(n).

In an embodiment, the first transistor T1, the second transistor T2, the third transistor T3, the fourth transistor T4, and the driving transistor TD may have substantially the same parameters. Further, the high level and the low level may be levels at which each of the first transistor T1, the second transistor T2, the third transistor T3, and the fourth transistor T4 may be turned on and off, respectively.

For further steps and details of the driving method, reference may be made to the foregoing description.

The foregoing embodiments of the present disclosure may be combined with each other in a case of no explicit conflict.

It should be understood that the above embodiments are merely exemplary embodiments for explaining the principles of the present disclosure, and the present disclosure is not limited thereto. It will be apparent to one of ordinary skill in the art that various changes and modifications may be made therein without departing from the spirit and essence of the present disclosure, and these changes and modifications are to be considered as falling within the scope of the present disclosure.

What is claimed is:

1. An OLED pixel compensation circuit, comprising an input sub-circuit, a compensation sub-circuit, a driving sub-circuit, a light-emitting sub-circuit, a data line, a scan line, and a light-emitting control line, wherein the input sub-circuit is coupled to the compensation sub-circuit and configured to input a data signal into the compensation sub-circuit;

the compensation sub-circuit is coupled to the driving sub-circuit and the light-emitting sub-circuit and configured to compensate a threshold voltage of the driving sub-circuit;

the driving sub-circuit is configured to drive the light-emitting sub-circuit to emit light after the threshold voltage of the driving sub-circuit is compensated;

the data line is configured to provide the data signal to the input sub-circuit;

the scan line is configured to provide a scan signal to the input sub-circuit;

the light-emitting control line is configured to provide a light-emitting control signal to the compensation sub-circuit;

the input sub-circuit comprises a first transistor and a second transistor;

the driving sub-circuit comprises a driving transistor;

the compensation sub-circuit comprises a third transistor, a fourth transistor and a storage capacitor, and the light-emitting control line is directly connected to both a gate electrode of the third transistor and a gate electrode of the fourth transistor;

the OLED pixel compensation circuit comprises only five transistors which are the first transistor, the second transistor, the third transistor, the fourth transistor, and the driving transistor; and an operation of the OLED pixel compensation circuit comprises two stages which are a data input stage and a compensation and light-emitting stage, in the data input stage, the first transistor and the second transistor are turned on, while the third transistor and the fourth transistor are turned off, and in the compensation and light-emitting stage, the first transistor and the second transistor are turned off, while the third transistor and the fourth transistor are turned on.

2. The OLED pixel compensation circuit according to claim 1, further comprising a reference voltage line, wherein the reference voltage line is configured to provide a reference voltage to the input sub-circuit, and the reference voltage is lower than a voltage of the data signal.

3. The OLED pixel compensation circuit according to claim 2, wherein the first transistor has a first electrode coupled to the reference voltage line, a second electrode coupled to the compensation sub-circuit, and a gate electrode coupled to the scan line; and the second transistor has a first electrode coupled to the data line, a second electrode coupled to the compensation sub-circuit, and a gate electrode coupled to the scan line.

4. The OLED pixel compensation circuit according to claim 3, wherein the third transistor further has a first electrode coupled to the second electrode of the first transistor, and a second electrode coupled to the second electrode of the second transistor;

the fourth transistor further has a first electrode coupled to the driving sub-circuit, and a second electrode coupled to the light-emitting sub-circuit; and the storage capacitor has a first terminal coupled to the second electrode of the second transistor and the second electrode of the third transistor, and a second terminal coupled to the first electrode of the fourth transistor.

5. The OLED pixel compensation circuit according to claim 4, wherein the light-emitting sub-circuit comprises an organic light-emitting diode, and an anode of the organic light-emitting diode is coupled to the second electrode of the fourth transistor.

6. The OLED pixel compensation circuit according to claim 4, wherein the driving transistor has a first electrode coupled to a positive power supply, a second electrode coupled to the first electrode of the fourth transistor, and a gate electrode coupled to the second electrode of the first transistor and the first electrode of the third transistor.

7. The OLED pixel compensation circuit according to claim 6, wherein the light-emitting sub-circuit comprises an organic light-emitting diode, and an anode of the organic light-emitting diode is coupled to the second electrode of the fourth transistor.

8. The OLED pixel compensation circuit according to claim 6, wherein the driving transistor is an N-type transistor, and the first electrode of the driving transistor is a drain electrode of the N-type transistor.

9. The OLED pixel compensation circuit according to claim 8, wherein the light-emitting sub-circuit comprises an organic light-emitting diode, and an anode of the organic light-emitting diode is coupled to the second electrode of the fourth transistor.

10. A driving method of an OLED pixel compensation circuit, wherein the OLED pixel compensation circuit is the OLED pixel compensation circuit according to claim 9, each of the first, second, third and fourth transistors is an N-type transistor, and the driving method comprises:

in the data input stage, inputting a high level through the scan line and inputting a low level through the light-emitting control line; and in the compensation and light-emitting stage, inputting a low level through the scan line and inputting a high level through the light-emitting control line.

11. A display device, comprising an OLED pixel compensation circuit, which comprises an input sub-circuit, a compensation sub-circuit, a driving sub-circuit, a light-emitting sub-circuit, a data line, a scan line, and a light-emitting control line, wherein the input sub-circuit is coupled to the compensation sub-circuit and configured to input a data signal into the compensation sub-circuit;

the compensation sub-circuit is coupled to the driving sub-circuit and the light-emitting sub-circuit and configured to compensate a threshold voltage of the driving sub-circuit;

the driving sub-circuit is configured to drive the light-emitting sub-circuit to emit light after the threshold voltage of the driving sub-circuit is compensated;

the data line is configured to provide the data signal to the input sub-circuit;

the scan line is configured to provide a scan signal to the input sub-circuit;

the light-emitting control line is configured to provide a light-emitting control signal to the compensation sub-circuit;

the input sub-circuit comprises a first transistor and a second transistor;

the driving sub-circuit comprises a driving transistor;

the compensation sub-circuit comprises a third transistor, a fourth transistor and a storage capacitor, and the light-emitting control line is directly connected to both a gate electrode of the third transistor and a gate electrode of the fourth transistor;

the OLED pixel compensation circuit comprises only five transistors which are the first transistor, the second transistor, the third transistor, the fourth transistor, and the driving transistor; and an operation of the OLED pixel compensation circuit comprises two stages which are a data input stage and a compensation and light-emitting stage, in the data input stage, the first transistor and the second transistor are turned on, while the third transistor and the fourth transistor are turned off, and in the compensation and light-emitting stage, the first transistor and the second transistor are turned off, while the third transistor and the fourth transistor are turned on.

12. The display device according to claim 11, wherein the OLED pixel compensation circuit further comprises a reference voltage line, and the reference voltage line is configured to provide a reference voltage to the input sub-circuit, and the reference voltage is lower than a voltage of the data signal.

13. The display device according to claim 12, wherein the first transistor has a first electrode coupled to the reference voltage line, a second electrode coupled to the compensation sub-circuit, and a gate electrode coupled to the scan line; and the second transistor has a first electrode coupled to the data line, a second electrode coupled to the compensation sub-circuit, and a gate electrode coupled to the scan line.

14. The display device according to claim 13, wherein the third transistor further has a first electrode coupled to the second electrode of the first transistor, and a second electrode coupled to the second electrode of the second transistor;

the fourth transistor further has a first electrode coupled to the driving sub-circuit, and a second electrode coupled to the light-emitting sub-circuit; and the storage capacitor has a first terminal coupled to the second electrode of the second transistor and the second electrode of the third transistor, and a second terminal coupled to the first electrode of the fourth transistor.

15. The display device according to claim 14, wherein the light-emitting sub-circuit comprises an organic light-emitting diode, and an anode of the organic light-emitting diode is coupled to the second electrode of the fourth transistor.

16. The display device according to claim 14, wherein the driving transistor has a first electrode coupled to a positive power supply, a second electrode coupled to the first electrode of the fourth transistor, and a gate electrode coupled to the second electrode of the first transistor and the first electrode of the third transistor.

17. The display device according to claim 16, wherein the light-emitting sub-circuit comprises an organic light-emitting diode, and an anode of the organic light-emitting diode is coupled to the second electrode of the fourth transistor.

18. The display device according to claim 16, wherein the driving transistor is an N-type transistor, and the first electrode of the driving transistor is a drain electrode of the N-type transistor.

19. The display device according to claim 18, wherein the light-emitting sub-circuit comprises an organic light-emitting diode, and an anode of the organic light-emitting diode is coupled to the second electrode of the fourth transistor.

* * * * *